United States Patent
Ding et al.

(10) Patent No.: US 11,558,686 B2
(45) Date of Patent: Jan. 17, 2023

(54) KNOB-LIKE INPUT FOR A HEARABLE DEVICE

(71) Applicant: Google LLC, Mountain View, CA (US)

(72) Inventors: Yao Ding, San Jose, CA (US); Tauseef Muzaffar, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/109,829

(22) Filed: Dec. 2, 2020

(65) Prior Publication Data

US 2022/0174391 A1 Jun. 2, 2022

(51) Int. Cl.
| | |
|---|---|
| H04R 1/10 | (2006.01) |
| G06F 3/01 | (2006.01) |
| G06F 3/044 | (2006.01) |
| G06F 3/16 | (2006.01) |

(52) U.S. Cl.
CPC ........... *H04R 1/1041* (2013.01); *G06F 3/017* (2013.01); *G06F 3/0448* (2019.05); *G06F 3/165* (2013.01); *H04R 1/1016* (2013.01); *H04R 2420/07* (2013.01)

(58) Field of Classification Search
CPC ....................................................... H04R 1/10
See application file for complete search history.

(56) References Cited

U.S. PATENT DOCUMENTS

| | | | |
|---|---|---|---|
| 2015/0177298 A1* | 6/2015 | Sugiura | G01B 7/003 324/658 |
| 2016/0100244 A1* | 4/2016 | Gentile | H04R 1/1041 345/174 |
| 2020/0037058 A1* | 1/2020 | Ueda | G06F 3/03547 |
| 2020/0100013 A1* | 3/2020 | Harjee | H03K 17/975 |
| 2021/0223908 A1* | 7/2021 | He | G06F 3/0443 |
| 2021/0281943 A1* | 9/2021 | Lehnert | G06F 3/165 |

FOREIGN PATENT DOCUMENTS

CN 206819084 U 12/2017

OTHER PUBLICATIONS

Troy Turner, A Literal Spin on Wireless Earbuds, Yanko Design, Jan. 22, 2018, 1 page.
"Major III Buetooth", retrieved from the internet on Aug. 25, 2020 <https://www.marshallheadphones.com/us/en/major-iii-bluetooth.html>, 2 pages.

* cited by examiner

*Primary Examiner* — Olisa Anwah
(74) *Attorney, Agent, or Firm* — Colby Nipper PLLC

(57) ABSTRACT

A wireless accessory has one or more sensors positioned at an outer periphery of its housing, thereby forming a knob-like input. The sensors may be configured to detect a change in contact force or contact location of first and second fingertips at respective first and second opposite sides of the periphery. An input gesture is determined based on the detected change, and a command corresponding to the gesture may be executed.

14 Claims, 10 Drawing Sheets

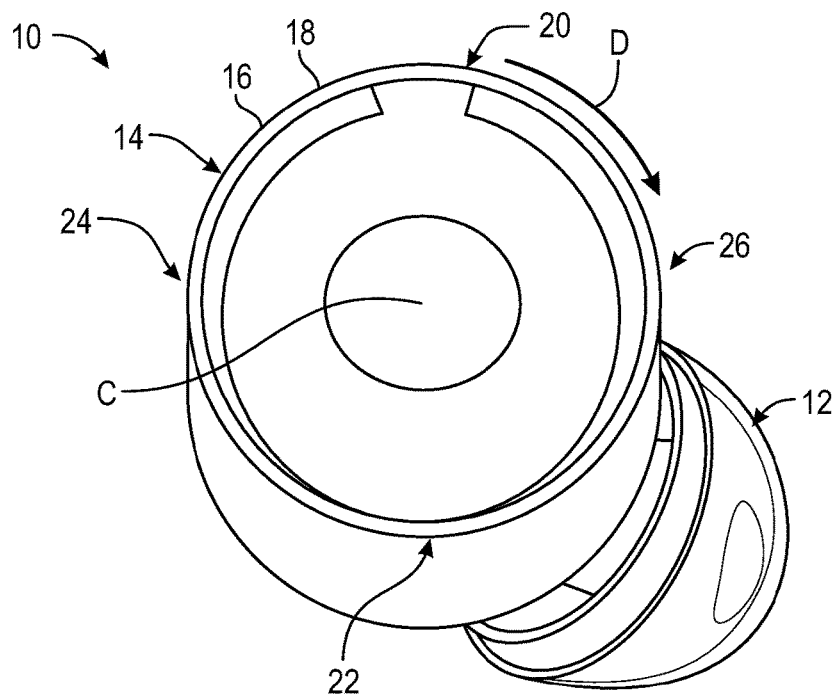
FIG. 1
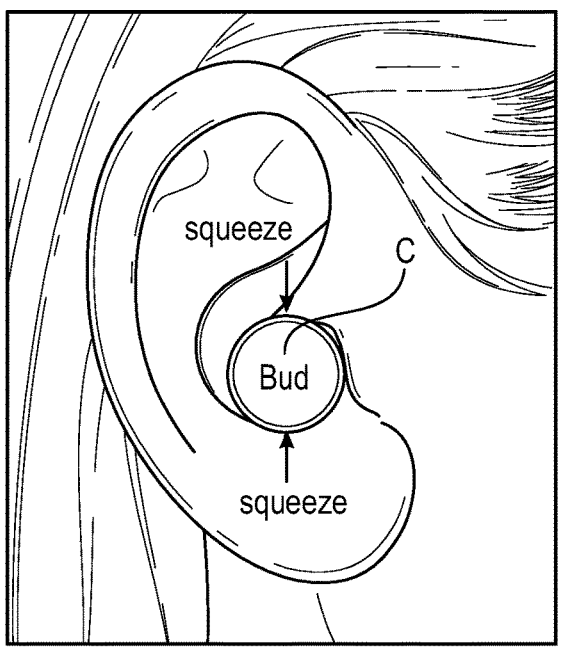 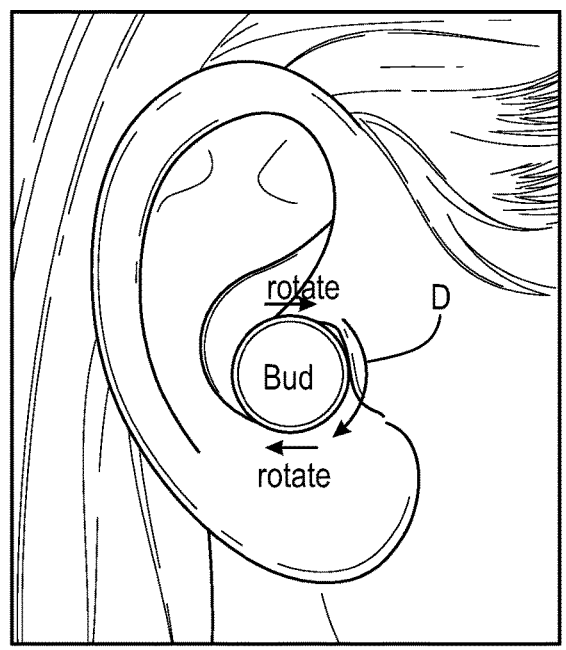
FIG. 2A   FIG. 2B

KNOB-LIKE INPUT FOR A HEARABLE DEVICE

BACKGROUND

Conventional wireless earbud controls include start/stop, volume up/down, and forward/backward. One method of consumer operation of these controls is a flat touchpad for entry of all of the aforementioned gestures. Another method is to have most of these controls reside within a wirelessly connected phone. Touching and tapping on the earbuds may be intuitive, but such actions may cause undesirable noise and ear discomfort from the tapping. Also, antenna performance may be affected by such touching or tapping, since the antenna may lie directly next to the touch area.

BRIEF SUMMARY

The present disclosure provides for a wireless accessory configured to receive input such as by squeezing and/or rotating a peripheral surface of the accessory. For example, one or more touch-sensitive sensors may be arranged at one or more positions along a peripheral surface of the accessory. As one example, two complementary touch sensors are positioned at a top portion of the accessory and two additional complementary touch sensors are positioned at a bottom portion of the accessory. Such combinations or touch sensors are configured to detect contact by a user's fingers and motions relative to the top and bottom surfaces, such as squeezing, sliding, rotating, etc.

One aspect of the disclosure provides a wireless accessory including a housing having a peripheral surface, one or more sensors disposed at the peripheral surface, the one or more sensors adapted to receive contact input, and one or more processors in communication with the one or more sensors. The one or more processors may be configured to receive a first input at the one or more sensors, receive a second input at the one or more sensors, compare the first input and the second input, determine, based on the comparison of the first input and the second input, a gesture, and identify a command corresponding to the gesture.

According to some examples, the wireless accessory may be an earbud. The one or more sensors may be strain gauges that are configured to detect an inward deflection of the peripheral surface. According to other examples, the one or more sensors may be radio sensors that are configured to detect a change in electric field pattern values at the peripheral surface. According to other examples, the one or more sensors may be one or more electrodes disposed adjacent the peripheral surface, and wherein comparing the first input and the second input comprises detecting a change in capacitance values of the one or more electrodes. The electrodes may be first and second pairs of complementary-shaped electrodes, the first and second pairs of electrodes being disposed at the respective first and second opposite portions of the peripheral surface, each of the electrodes being configured to output a respective capacitance value. Each of the first pair and the second pair of complementary-shaped electrodes may be triangle-shaped electrodes, each pair oriented such that a longest side of each of the electrodes of the pair confronts one another. Each of the electrodes may have a major surface that extends generally parallel to an adjacent surface of the external portion, such that when first and second fingertips are placed onto the first and second sides of the peripheral circumference, the first and second fingertips overlie both electrodes of the respective first and second pairs of the electrodes. The command may be based on a comparison of a first combined capacitance value of an outer electrode of each pair that are connected in parallel, with a second combined capacitance value of an inner electrode of each pair that are connected in parallel. In other examples the command may be based on a comparison of individual capacitances of each of the electrodes.

Further aspects of the disclosure provide a method of controlling a wireless accessory. The method includes receiving, at a first portion of one or more sensors at a peripheral surface of the wireless accessory, a first input corresponding to a touch contact, receiving, at a second portion of the one or more sensors, a second input, comparing, with one or more processors, the first input and the second input, determining, based on the comparing, a gesture corresponding to the first input and the second input, and identifying, with the one or more processors, a command corresponding to the determined gesture.

Yet another aspect of the disclosure provides a non-transitory computer-readable medium for controlling a wireless accessory, the non-transitory computer-readable medium having instructions stored thereon which, if executed by a computing device, cause the computing device to perform operations. Such operations may include receiving, at a first portion of one or more sensors at a peripheral surface of the wireless accessory, a first input corresponding to a touch contact, receiving, at a second portion of the one or more sensors, a second input, comparing the first input and the second input, determining, based on the comparing, a gesture corresponding to the first input and the second input, and identifying a command corresponding to the determined gesture.

BRIEF DESCRIPTION OF THE DRAWINGS

FIG. 1 is a perspective view of a wireless earbud according to aspects of the disclosure.

FIG. 2A illustrates a schematic location of the wireless earbud of FIG. 1 in a human ear, with illustrative squeeze directions according to aspects of the disclosure.

FIG. 2B illustrates a schematic location of the wireless earbud of FIG. 1 in a human ear, with illustrative rotation directions according to aspects of the disclosure.

DETAILED DESCRIPTION

Figure 3A:
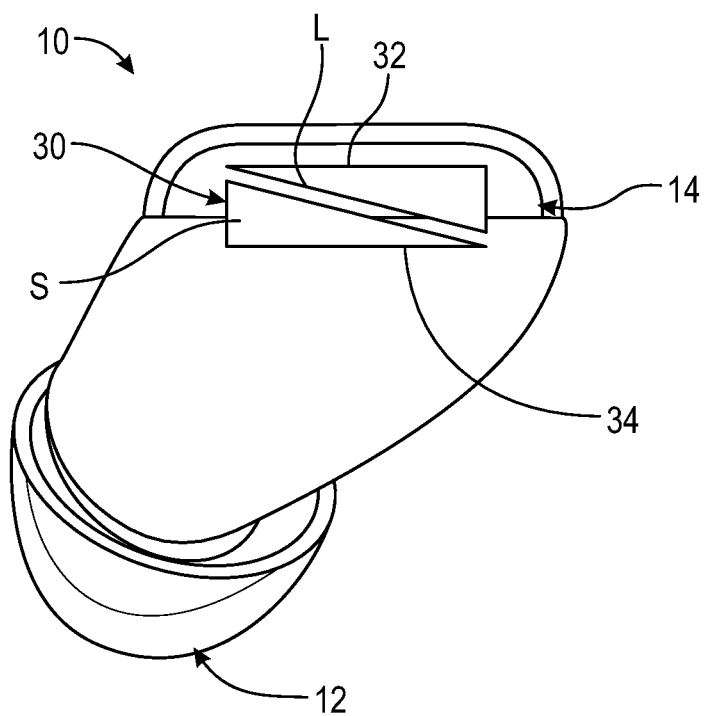
FIG. 3A is a top view of the wireless earbud of FIG. 1, showing schematic locations of a top pair of triangle-shaped electrodes.

The technology relates generally to a wireless accessory, such as a wearable electronic device, that is configured to be controlled by gentle squeezing or rotational finger motion along a peripheral circumference of the accessory. While the accessory is illustrated and described herein as an earbud, it should be understood that the accessory may be any of a variety of wearable electronic devices, including a pendant, smartwatch, bracelet, fitness tracker, ring, smart glasses, headset, helmet, or the like.

Referring to FIGS. 1, 2A, and 2B, a wireless earbud 10 may include an internal portion 12 including a speaker (not shown) for playing audio signals (e.g., music, telephone audio, podcasts, etc.) to a user. The internal portion 12 may be configured to be seated at least partially into a human ear canal. The wireless earbud 10 may have an external portion 14 including a knob-like input 16, the knob-like input 16 having a peripheral circumference 18 adapted to receive input through contact at one or more portions of the peripheral circumference 18. The knob-like input need not have a moveable part with respect to a housing of the wireless earbud. Rather, the knob-like input may include one or more sensors positioned at selected portions along a peripheral circumference of the earbud. Within the internal portion 12 and/or the external portion 14, the wireless earbud 10 may include a communication component configured to transmit a signal to wirelessly coupled device.

The wireless earbud 10 may be configured to be controlled by the user. For example, a user may wish to turn the power off or on, start or stop music from playing, turn the volume up or down, or advance songs or audio tracks forward or backward in sequence. A user may control the wireless earbud 10 by grasping the external portion 14 with first and second fingertips placed at opposite sides of the peripheral circumference 18. A user may actuate the knob-like input 16 by either: (i) squeezing the fingertips towards a center C of the knob-like input, as shown in FIG. 2A; or by (2) rotating each of the fingertips by a small amount of the peripheral circumference 18 in a same circumferential direction D about the center of the knob-like input, as shown in FIG. 2B.

While the peripheral circumference of the earbud 10 is shown as being circular, it should be understood that in other examples, the periphery of the accessory may take a different shape, such as oval, square, rectangular, octagonal, etc. Regardless of the shape of the housing of the accessory, the sensors may be positioned along the periphery to receive contact from a user's fingers.

Figure 3B:
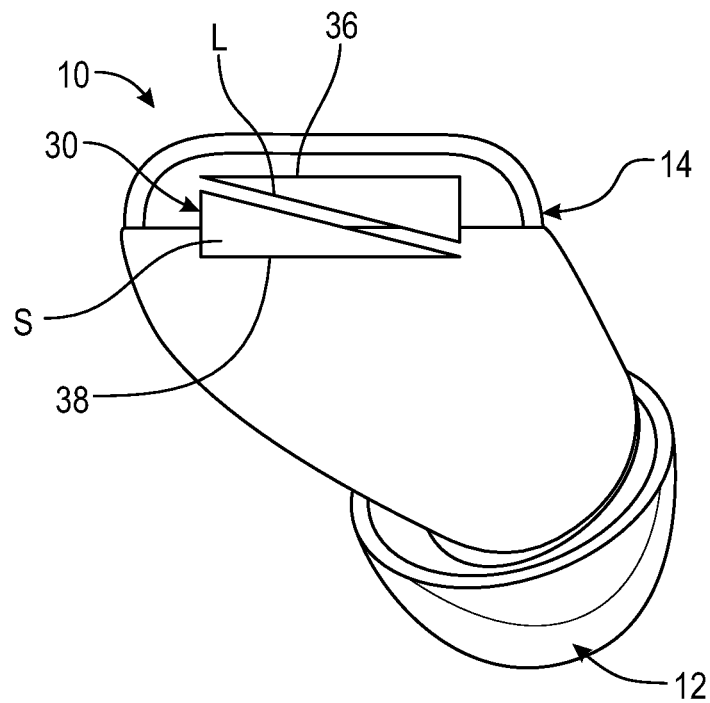
FIG. 3B is a bottom view of the wireless earbud of FIG. 1, showing schematic locations of a bottom pair of triangle-shaped electrodes.

Referring now to FIGS. 3A and 3B, the wireless earbud 10 may include a plurality of electrodes 30. The electrodes 30 may include first and second pairs of complementary-shaped electrodes 32/34 and 36/38. The first and second pairs of electrodes 32/34 and 36/38 may be disposed at opposite lateral sides of the peripheral circumference, such as the opposite lateral sides 20/22 or 24/26 shown in FIG. 1. Each of the electrodes 30 may be configured to output a respective capacitance value upon contact of a fingertip onto the peripheral circumference 18 of the knob-like input 16. Each of the electrodes 30 may be attached to an inside surface of the peripheral circumference 18 of the knob-like input 16. Each of the electrodes 30 may be made with a flex or laser direct structuring (LDS). The capacitance of one or more of the electrodes 30 may be sensed, for example, by a capacity proximity sensor such as a CapSense sensor, as will be described in more detail below with respect to FIGS. 8A and 8B. By way of example only, the sensors may have an initial sampling rate of 10 Hz to save energy before capturing the initial contact of a fingertip onto the peripheral circumference 18. Once an initial contact is detected, the sensors may have a higher sampling rate, such as 10-200 Hz.

Each of the first pair and the second pair of electrodes 32/34 and 36/38 may have complementary shapes. For example, as shown in FIGS. 3A and 3B, each of the electrodes 30 are triangle-shaped electrodes, and each pair of electrodes 32/34 and 36/38 are oriented such that a longest side L of each of the electrodes of the pair confronts one another. Each of the electrodes 30 may have a major surface S that extends generally parallel to an adjacent surface of the external portion, such that when a user's fingertips are placed onto the peripheral circumference 18, each fingertip overlies both electrodes 30 of the corresponding pair of the electrodes (32/34 or 36/38).

In one example, each of the electrodes 30 may extend in the circumferential direction D (see FIGS. 1 and 2B) between 25% and 45% of a length of the peripheral circumference C of the knob-like input 16. In other examples, each of the electrodes 30 may extend any percentage of the peripheral circumference C between 0% and 50%, as long as the electrodes are wide for a user to successfully place fingertips onto the electrodes 30 without being able to see the earbud, and as long it is unlikely that a user will inadvertently overlie all four electrodes with a single fingertip contact.

Figure 4A:
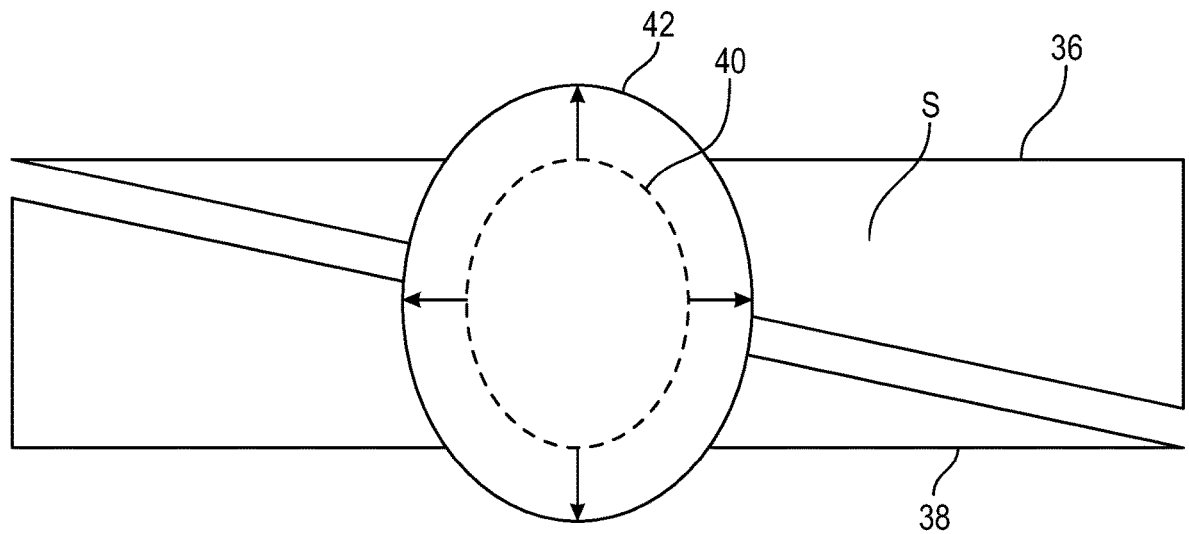
FIG. 4A is a diagrammatic view of an enlarging contact area between a human fingertip and the bottom pair of the electrodes of FIG. 3B.

Referring now to FIG. 4A, an initial contact area 40 of a fingertip is shown, overlying portions of the major surface S of both electrodes 36/38 of the second pair. This initial contact area 40 may be sensed by a capacitive proximity sensor, for example. If a user desires to actuate the knob-like input 16 by squeezing the fingertips towards a center C of the knob-like input (e.g., FIG. 2A), the increased force between the fingertips and the knob-like input will spread the contact between the fingertips and the knob-like input over a larger contact area 42.

This increase in fingertip contact area from the initial contact area 40 to the larger contact area 42 will result in a corresponding increase in the percentage of the major surface S of each of the electrodes 36, 38 that the fingertip contact area overlies. In this example, since the fingertip is only pressing harder onto the knob-like input 16 and it is not translating relative to the knob-like input 16, the sensed capacitance of each of the electrodes 36 and 38 both increase, thereby indicating a squeeze command.

Once the communication component (not shown) of the wireless earbud 10 receives the squeeze command, the communication component will send a corresponding command to a processor, such as a microprocessor within the earbud or a processor within a wireless coupled device, such as a mobile phone or other host device. The command may include, for example, start, stop, pause, resume, volume adjustment, content change, such as skipping to a next song, etc. If desired, a single squeeze may provide a different command than a double squeeze separated by a predetermined time interval, such as 500 ms to 1000 ms.

Figure 4B:
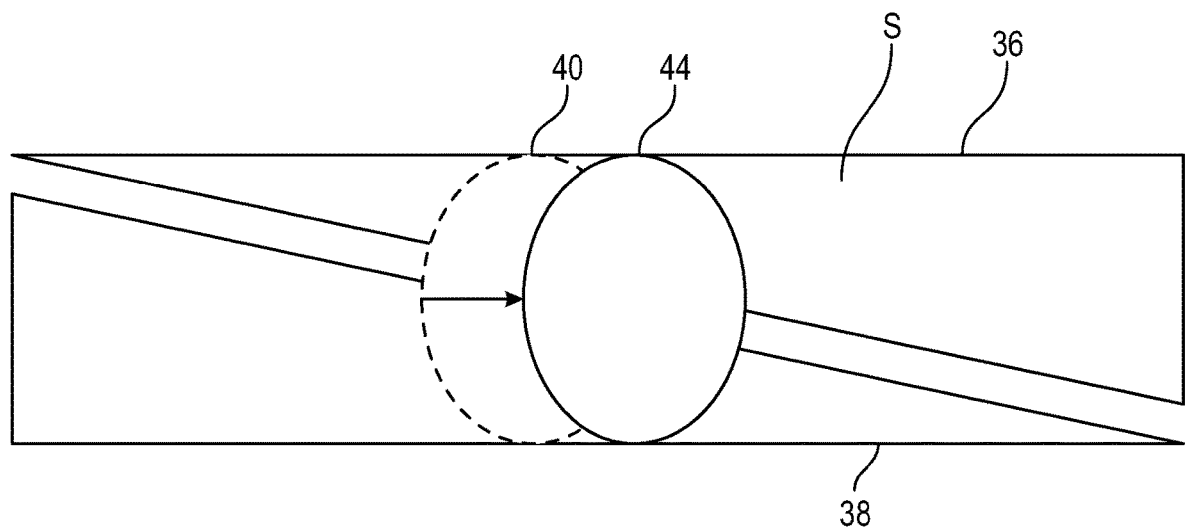
FIG. 4B is a diagrammatic view of a translating contact area between a human fingertip and the bottom pair of the electrodes of FIG. 3B.

Referring now to FIG. 4B, an initial contact area 40 of a fingertip is shown, overlying portions of the major surface S of both electrodes 36/38 of the second pair. This initial contact area 40 may be sensed by a capacitive proximity sensor, for example. If a user desires to actuate the knob-like input 16 by rotating the fingertips in a same circumferential direction D about the center C of the knob-like input (e.g., FIGS. 1 and 2B), the rotation of the fingertips relative to the knob-like input will translate the contact between the fingertips and the knob-like input to a final contact area 44, which is circumferentially offset from the initial contact area in the opposite direction of the rotation of the fingertips.

This translation in fingertip contact area from the initial contact area 40 to the final contact area 44 will result in a corresponding increase in the percentage of the major surface S of the upper electrode 36 that the fingertip contact area overlies, while at the same time resulting in a corresponding decrease in the percentage of the major surface of the lower electrode 38 that the fingertip contact area overlies. In this example, since the fingertip has translated relative to the knob-like input 16, the sensed capacitance of each of the electrodes 36 and 38 move in opposite directions, thereby indicating a rotation gesture. Only a very slight translation of the fingertip is needed for the capacitance change of the electrodes 36, 38 to be sensed, such as a few degrees about the center C or less than 5% of the peripheral circumference 18.

Once the communication component (not shown) of the wireless earbud 10 receives the rotation gesture, the communication component will send a corresponding signal to the processor or to a communicatively coupled device. According to some examples, a single rotation may provide a different command than a double rotation separated by a predetermined time interval, such as 500 ms to 1000 ms. According to further examples, a rotation in one circumferential direction may provide a different command than a rotation in the opposite circumferential direction. For example, rotation in a first direction may correspond to a "volume up" command while rotation in the opposite direction may correspond to a "volume down" command.

Figure 5A:
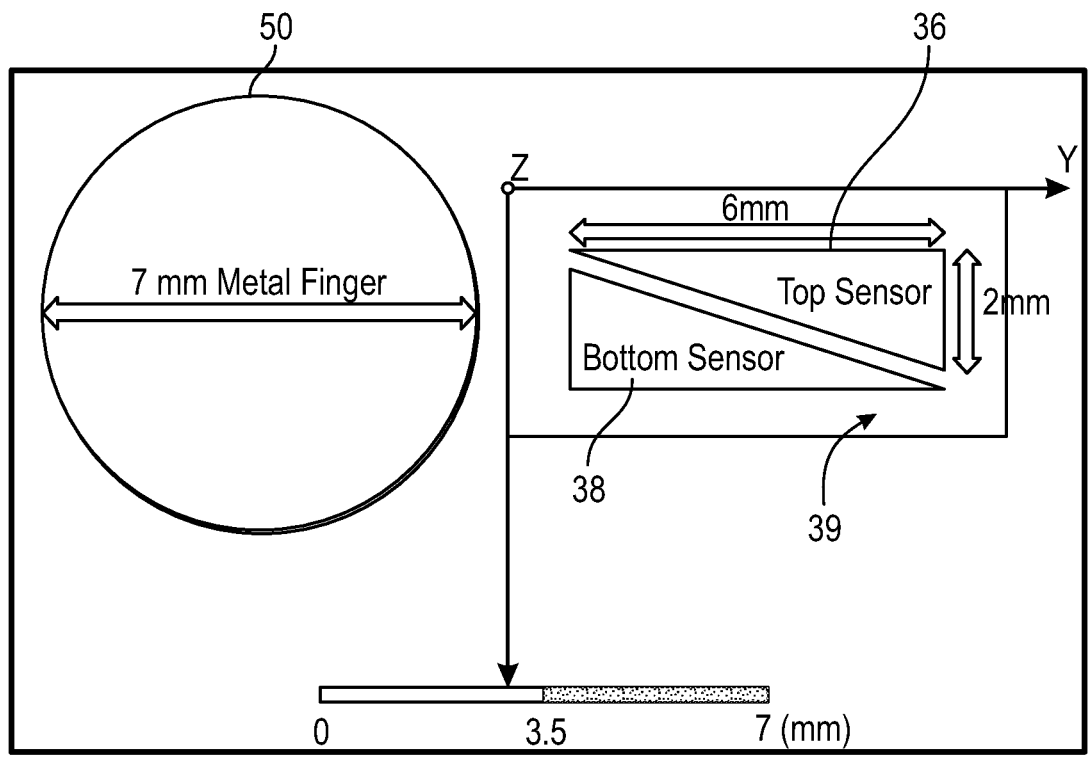
FIGS. 5A and 5B are a diagrammatic top plan view and a diagrammatic perspective view of a 7 mm diameter simulated fingertip adjacent to the bottom pair of the electrodes of FIG. 3B.
Figure 5B:
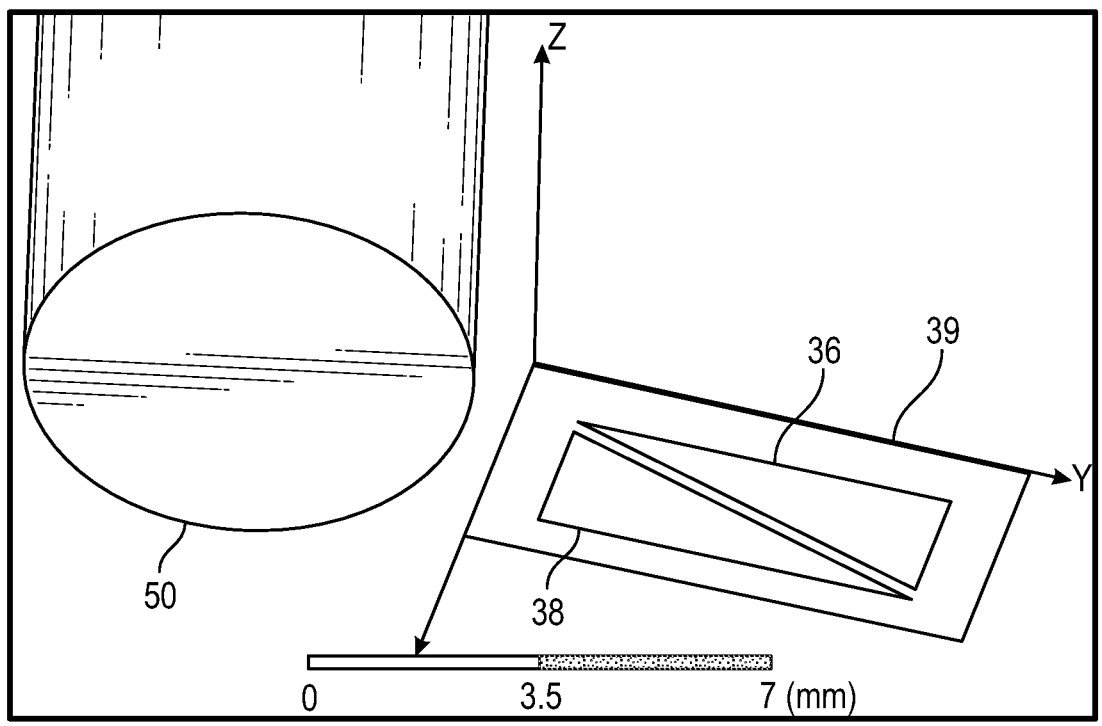
Figure 6A:
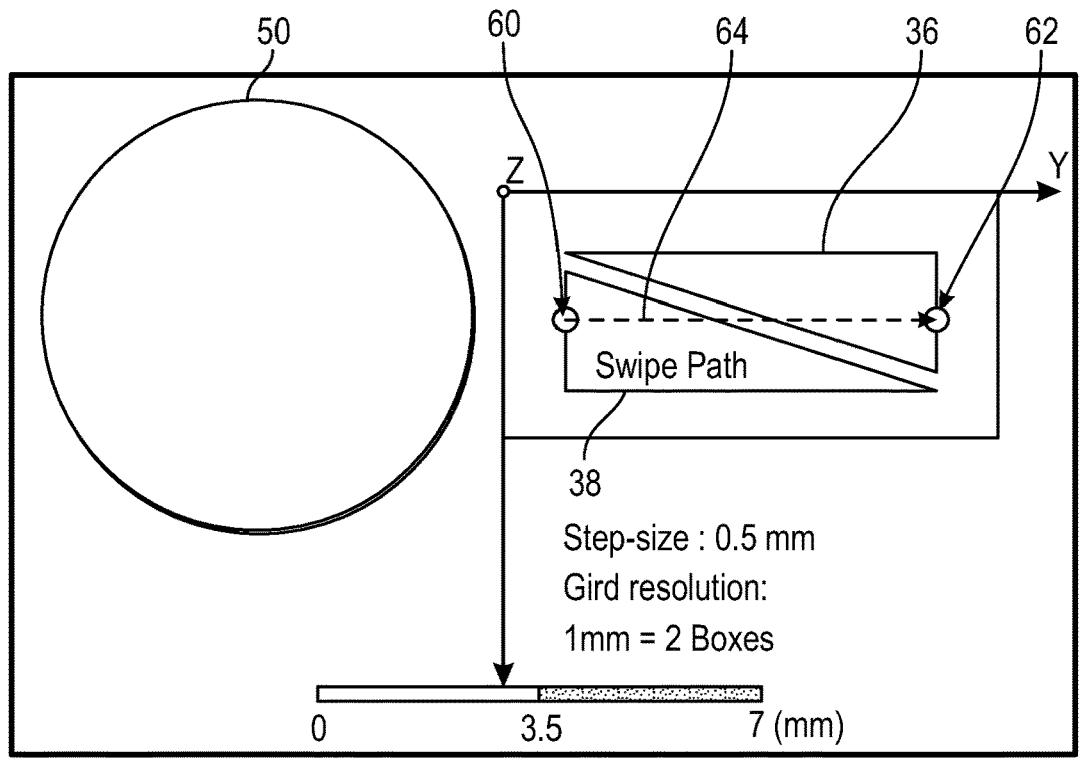
FIG. 6A is a diagrammatic top plan view of the simulated fingertip and the bottom pair of the electrodes of FIG. 5A, showing a finger swipe path across the electrodes.

FIGS. 5A, 5B, and 6A illustrate a 7 mm diameter simulated fingertip 50 adjacent to the second pair of the electrodes 36, 38, which are covered by a dielectric cover 39. As can be seen in FIG. 6A, this arrangement may be used to test the sensed capacitance of the electrodes 30 as the simulated fingertip 50 translates across the electrodes from a starting point 60 to an ending point 62 along a lateral swipe path 64.

Figure 6B:
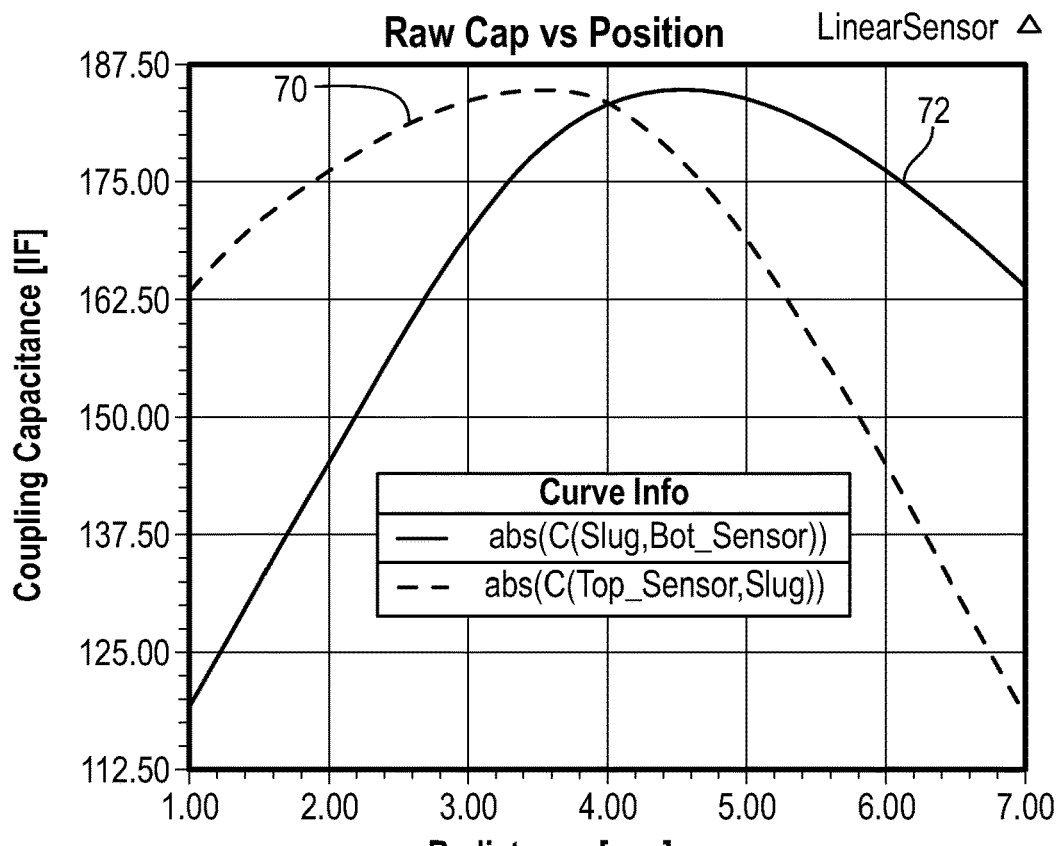
FIG. 6B is a chart of capacitance versus fingertip position using the simulated fingertip and the electrodes of FIG. 6A.

The results of the simulation can be seen in FIG. 6B. Initially, the simulated fingertip 50 is overlying the lower electrode 38 much more than the upper electrode 36, so the measured capacitance 70 of the lower electrode 38 is much higher than the measured capacitance 72 of the upper electrode 36. Then, as the simulated fingertip 50 translates towards the ending point 62, the measured capacitance 72 of the upper electrode 38 becomes much higher than the measured capacitance 70 of the lower electrode 36. This arrangement approximately simulates the measured capacitance of the electrodes 36, 38 with a translating contact area of a fingertip slightly rotating the knob-like input 16.

Figure 7A:
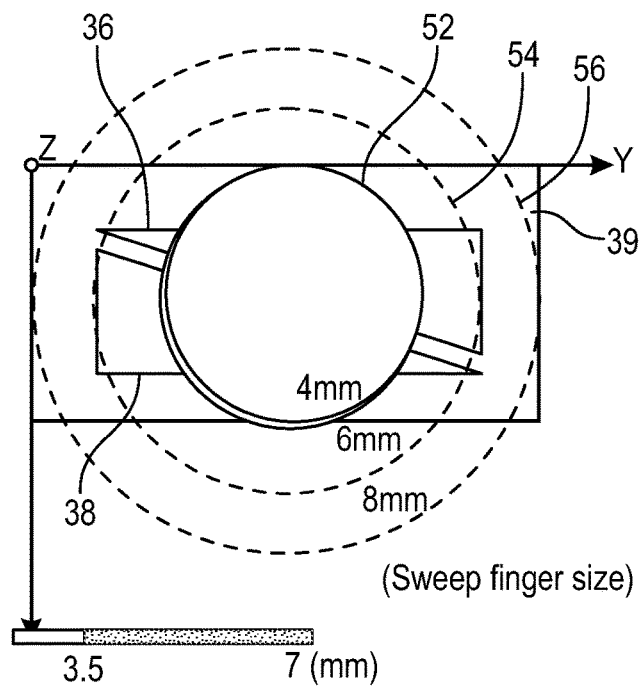
FIG. 7A is a diagrammatic top plan view of a varying-size simulated fingertip overlying the bottom pair of the electrodes of FIG. 3B, showing an enlarging contact area between the simulated fingertip and the electrodes.

FIG. 7A illustrates a varying-size simulated fingertip 52 overlying the second pair of the electrodes 36, 38, which are covered by a dielectric cover 39. This arrangement may be used to test the sensed capacitance of the electrodes 30 as the contact area (or overlying area) between the simulated fingertip 52 and the electrodes 36, 38 is increased from 4 mm to 6 mm (simulated fingertip size 54), and then to 8 mm (simulated fingertip size 56).

Figure 7B:
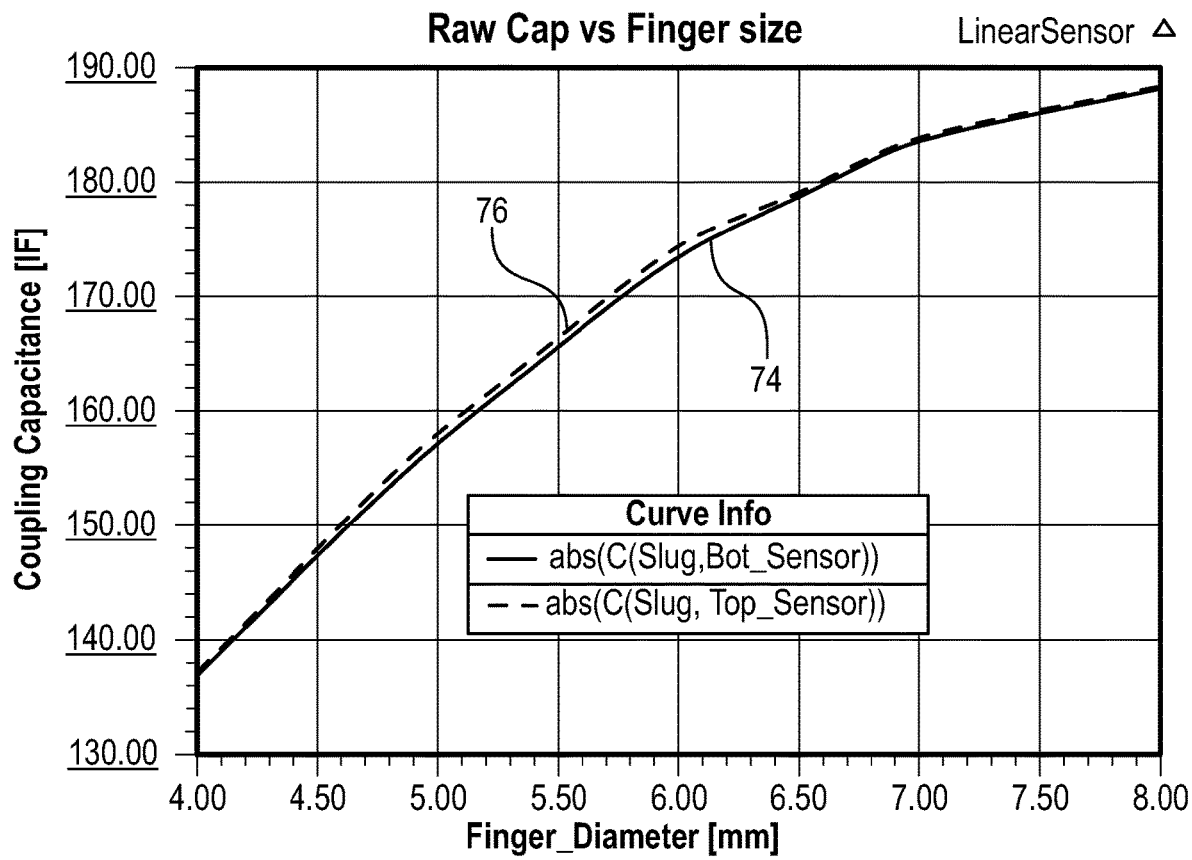
FIG. 7B is a chart of capacitance versus finger contact area using the simulated fingertip and the electrodes of FIG. 7A.

The results of the simulation can be seen in FIG. 7B. Initially, the simulated fingertip 52 is overlying a central region of each of the electrodes 36, 38, so the measured capacitances 74 and 76 are relatively low. Then, as the simulated fingertip 52 transitions to the larger sizes 54 and 56, the measured capacitances 74 and 76 of both electrodes 36, 38 become much higher. This arrangement approximately simulates the measured capacitance of the electrodes 36, 38 with an enlarging contact area of a fingertip being squeezed against the knob-like input 16.

Figure 8B:
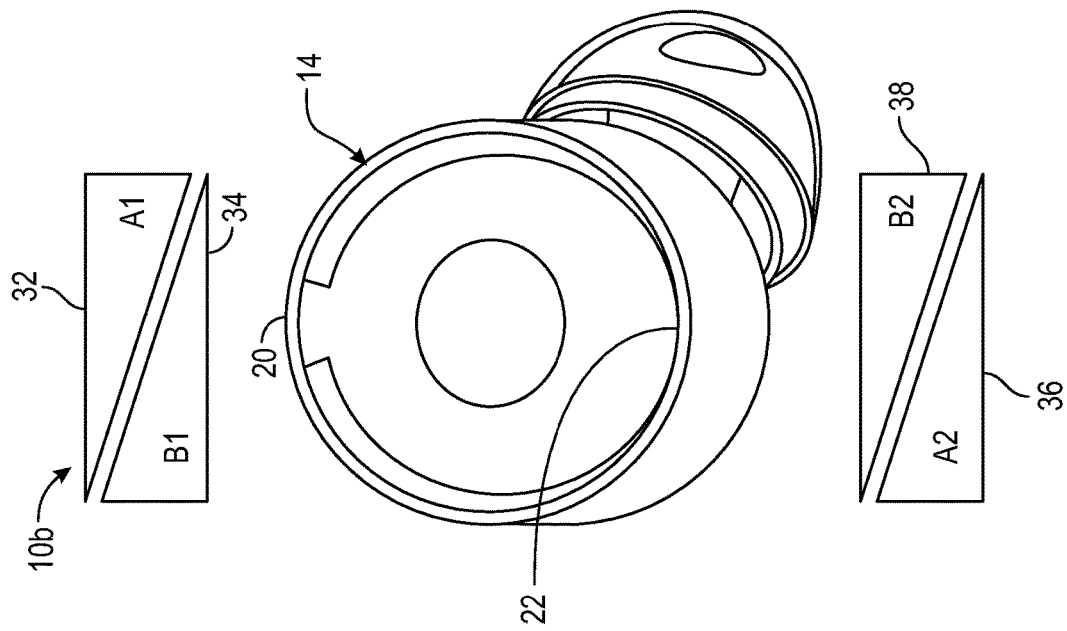
FIG. 8B is a perspective view of the wireless earbud of FIG. 1A having the triangle-shaped electrodes of FIGS. 3A and 3B, showing independent capacitance outputs from the electrodes.
Figure 8A:
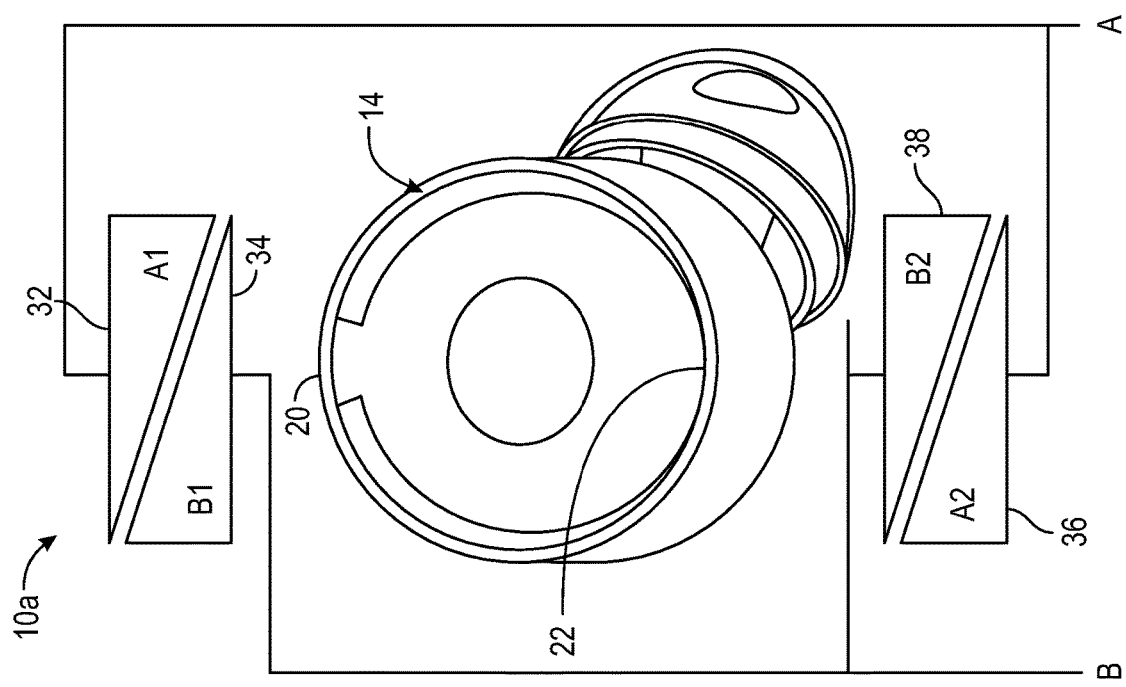
FIG. 8A is a perspective view of the wireless earbud of FIG. 1A having the triangle-shaped electrodes of FIGS. 3A and 3B, showing a parallel connection between the electrodes.

FIG. 8A is a perspective view of a wireless earbud 10a that is a specific implementation of the wireless earbud 10 of FIGS. 1 through 4B, showing parallel sensor signal processing between the electrodes. In the example shown, the upper electrodes 32 and 36 of each of the electrode pairs are connected in parallel to a common capacitive sensor A, summing the capacitance of the upper electrodes, and the lower electrodes 34 and 38 are connected in parallel to a common capacitive sensor B, summing the capacitance of the lower electrodes.

In use, if a user desires to actuate the knob-like input 16 by squeezing the fingertips thereon, the capacitive sensors A and B will both sense an increase in capacitance, and the appropriate squeeze command can be given. If a user rotates the earbud 10a clockwise, then sensor A will see a decrease in capacitance and sensor B will see an increase, and an appropriate rotation command can be given. If a user rotates the earbud 10a counterclockwise, then sensor A will see an increase in capacitance and sensor B will see a decrease, and an appropriate rotation command can be given.

FIG. 8B illustrates another example implementation of the wireless earbud 10 of FIGS. 1 through 4B, showing independent capacitance outputs from the electrodes, so four capacitive sensors are used. In the example shown, each of the electrodes 32, 34, 36, and 38 are connected to their own capacitive sensor. Similar to the implementation of the earbud 10a, if a user desires to actuate the knob-like input 16 by squeezing the fingertips thereon, all of the capacitive sensors will sense an increase in capacitance, and the appropriate squeeze command can be given.

A rotation gesture may be detected if the capacitance for A1/(A1+B2) decreases and the capacitance for B1/(A2+B1) increases. For examples, this indicates that the user has rotated the earbud 10b clockwise. If the capacitance for A1/(A1+B2) increases and the capacitance for B1/(A2+B1) decreases, this indicates that the user has rotated the earbud 10b counter-clockwise.

The wireless earbuds 10, 10a, and 10b shown in FIGS. 1-8B are just illustrative examples. Many other variations of the wireless earbuds 10 are contemplated, including imaging earbuds having different types of sensors. In one example, the detection of a change in contact force or contact location of fingertips on the peripheral circumference 18 of the external portion 14 of the wireless earbuds can be performed by strain gauges. Such strain gauges can detect an inward deflection of the peripheral circumference 18, and the sending of the actuation command may be based on strain values detected by the strain gauges. In another example, the detection of a change in contact force or contact location of fingertips on the peripheral circumference 18 can be performed by radio sensors. Such radio sensors can detect a change in electric field pattern values at the peripheral circumference 18, and the sending of the actuation command may be based on a change in the electric field pattern values detected by the radio sensors.

Figure 9A:
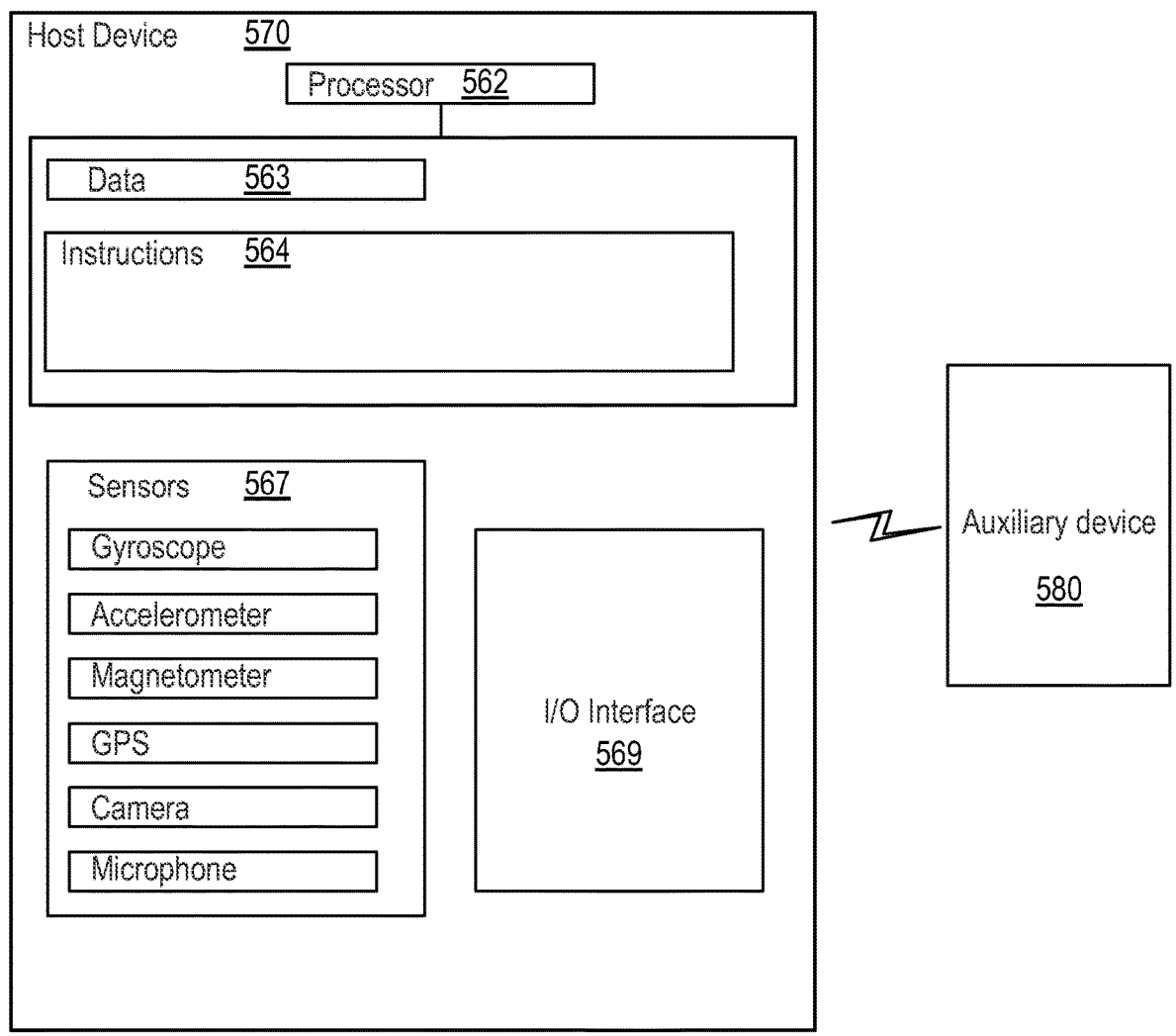
FIG. 9A is a block diagram of an example system according to aspects of the disclosure.
Figure 9B:
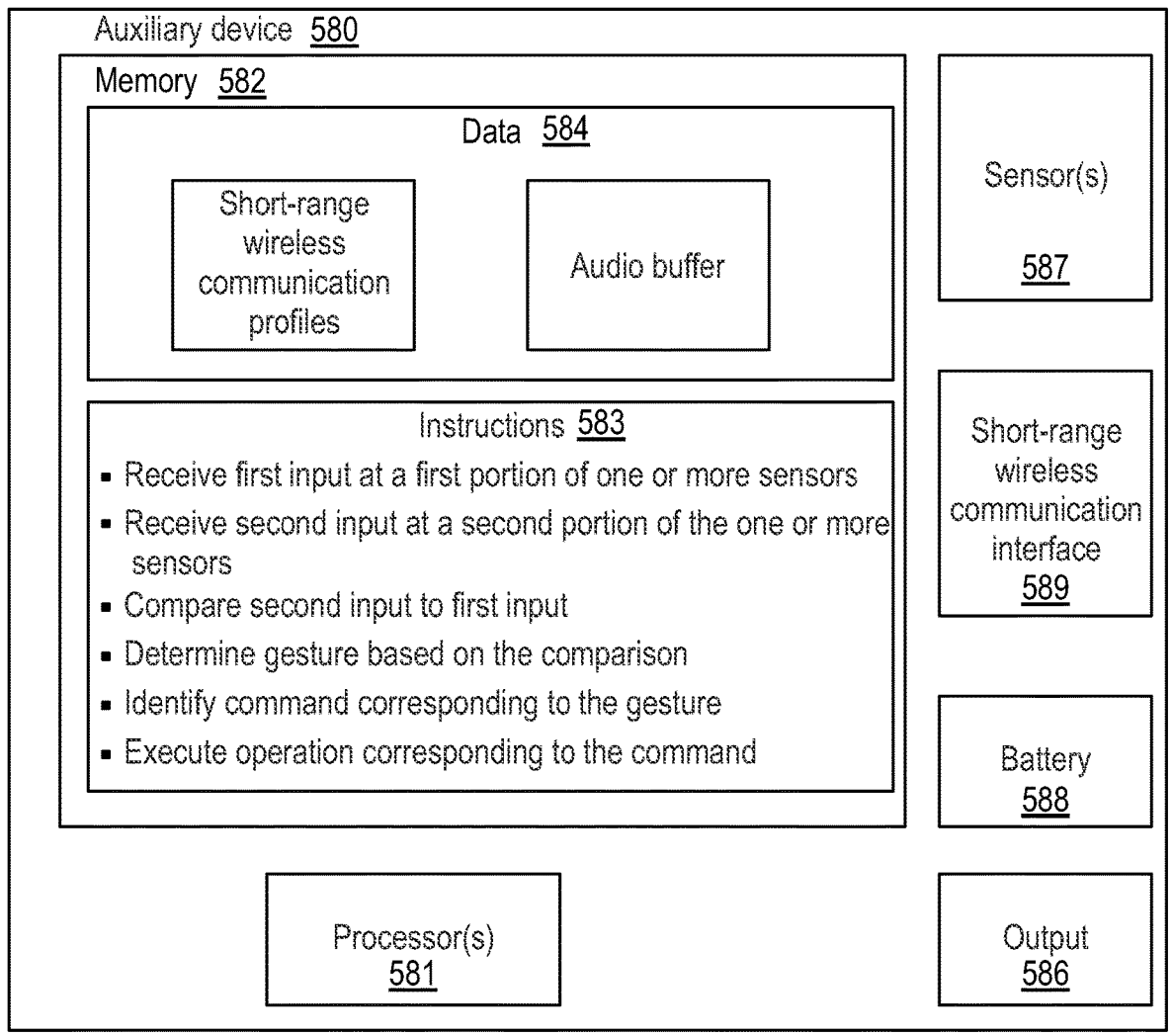
FIG. 9B is a block diagram of an example wireless accessory according to aspects of the disclosure.

FIG. 9A is a block diagram of a system including a host device 570, such as a mobile phone, in communication with an auxiliary device 580, such as a wireless earbud. FIG. 9A illustrates the internal components of the host device 570, while FIG. 9B illustrates the internal components of the auxiliary device 580. While a number of such internal components are shown, it should be understood that such components are merely non-limiting examples, and that other components may additionally or alternatively be included.

Host device 570 includes processor 562, memory including data 563 and instructions 564, and one or more sensors 567. The one or more processors 562 may be any conventional processors, such as commercially available microprocessors. Alternatively, the one or more processors may be a dedicated device such as an application specific integrated circuit (ASIC) or other hardware-based processor. Although FIG. 9A functionally illustrates the processor, memory, and other elements of host 570 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of host 570. Accordingly, references to a processor or computing device will be understood to include references to a collection of processors or computing devices or memories that may or may not operate in parallel.

Memory may store information that is accessible by the processors 562, including instructions 564 that may be executed by the processors 562, and data 563. The memory may be of a type of memory operative to store information accessible by the processors 562, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 564 and data 563 are stored on different types of media.

Data 563 may be retrieved, stored or modified by processors 562 in accordance with the instructions 564. For instance, although the present disclosure is not limited by a particular data structure, the data 563 may be stored in computer registers, in a relational database as a table having a plurality of different fields and records, XML documents, or flat files. The data 563 may also be formatted in a computer-readable format such as, but not limited to, binary values, ASCII or Unicode. By further way of example only, the data 563 may be stored as bitmaps comprised of pixels that are stored in compressed or uncompressed, or various image formats (e.g., JPEG), vector-based formats (e.g., SVG) or computer instructions for drawing graphics. Moreover, the data 563 may comprise information sufficient to identify the relevant information, such as numbers, descriptive text, proprietary codes, pointers, references to data stored in other memories (including other network locations) or information that is used by a function to calculate the relevant data. According to some examples, the data 563 may store machine learning policies for identifying a recommended buffer size corresponding to a particular set of conditions.

The instructions 564 may be executed to communicate with or control operation of the auxiliary device 580. For example, the instructions may be executed to receive input from the auxiliary device and perform an action in response, such as modifying content being relayed to the auxiliary device. By way of example, the processor 562 may receive an input signal from the auxiliary device 580, the input signal corresponding to an input gesture received at the knob-like input of the auxiliary device 580. The input signal may be matched with a command, such as changing a volume of playback audio, changing content, pausing or resuming content, etc.

The sensors 567 may include, by way of example and not limitation, a gyroscope, accelerometer, magnetometer, GPS, camera, microphone, light sensor, motion sensor, etc.

The device 560 further includes an input/output (I/O) interface 569. I/O interface 569 may provide for communication, using analog or digital modulation, between the host device 570 and the auxiliary device 580. The I/O interface 569 may also be used for communication with other devices or networks, such as a radio access network or an access point. I/O interface 569 may include a wireline interface, such as an Ethernet, Universal Serial Bus (USB), or High-Definition Multimedia Interface (HDMI) port. I/O interface 569 may also include a wireless interface, such as a Wi-Fi, or wide-area wireless interface (e.g., WiMAX or 3GPP Long-Term Evolution (LTE)). Other forms of physical layer interfaces and other types of communication protocols may also be used. Furthermore, I/O interface 569 may comprise multiple physical communication interfaces, such as a Wifi interface, a short range wireless interface, and a wide-area wireless interface, and may enable multiple simultaneous connections of different types.

It should be understood that the device 570 may include other components which are not shown, such charging input for a battery, signals processing components, etc. Such components may also be utilized in execution of the instructions 564.

The auxiliary device 580 is illustrated in further detail in FIG. 9B. Auxiliary device 580 may be any type of wireless accessory. By way of example, the auxiliary device 580 may be a wireless earbud. In other examples, the auxiliary device may be a headset, smart glasses, a pendant, smartwatch, fitness tracker, motorcycle helmet, etc. The auxiliary device 580 may also include one or more processors 581, memory 582 including instructions 583 and data 584, and a wireless communication interface 589.

The auxiliary device 580 includes one or more sensors 587, including sensors forming a knob-like input. For example, the sensors 587 may include a plurality of capacitive touch sensors arranged near a peripheral surface of the auxiliary device 580 for receiving touch input from a user. The touch input may include one or more gestures, such as squeezing, rotating, or the like. According to other examples, the one or more sensors 587 may include any of a variety of mechanical or electromechanical sensors for detecting contact by a user's fingers, such sensors including an accelerometer, gyroscope, light sensor, barometer, audio sensor (e.g., microphone), vibration sensor, heat sensor, radio frequency (RF) sensor, etc.

The auxiliary device 580 may further include other components typically present in earbuds and other electronic accessories, such as output 586 and battery 588. In the example of earbuds, the output 596 may be speakers, though in other auxiliary devices the output may include other components such as a display, etc. While a few components of the auxiliary device 580 are shown, it should be understood that the device may include any number of additional components that are typically provided in auxiliary devices.

The processor 581 and memory 582 may be any of a variety of different types, similar to those discussed above in connection with the host device 570. For example, memory 582 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 420 may be a static random-access memory (SRAM) configured to provide fast lookups. Systems and methods may include different combinations of the foregoing, whereby different portions of the instructions and data are stored on different types of media.

The memory 582 may further include a buffer, such as an audio buffer, such as in the data 584. In some examples the memory 582 may further include short range wireless communication profiles, such as Bluetooth profiles.

The instructions 583 may be any set of instructions to be executed directly (such as machine code) or indirectly (such as scripts) by the one or more processors 581. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance.

The instructions 583 may be executed to detect input at the sensors forming the knob-like input and to determine a response to the input. For example, the response may include transmitting a signal corresponding to the input to the host device 570. In other examples, the response may include identifying a gesture corresponding to the input, determining a command corresponding to the gesture, and executing a procedure responsive to the command.

The one or more processors 581 may be microprocessors, logic circuitry (e.g., logic gates, flip-flops, etc.) hard-wired into the device 580 itself, or may be a dedicated application specific integrated circuit (ASIC). It should be understood that the one or more processors 430 are not limited to hard-wired logic circuitry, but may also include any commercially available processing unit, or any hardware-based processors, such as a field programmable gate array (FPGA). In some examples, the one or more processors 581 may include a state machine. The processors 581 may be configured to execute the instructions 583.

The short-range wireless pairing interface 589 may be used to form connections with other devices, such as the host device, such as a mobile phone providing the audio packets. The connection may be, for example, a Bluetooth connection or any other type of wireless pairing. By way of example only the connection may include an ACL link.

Figure 10:
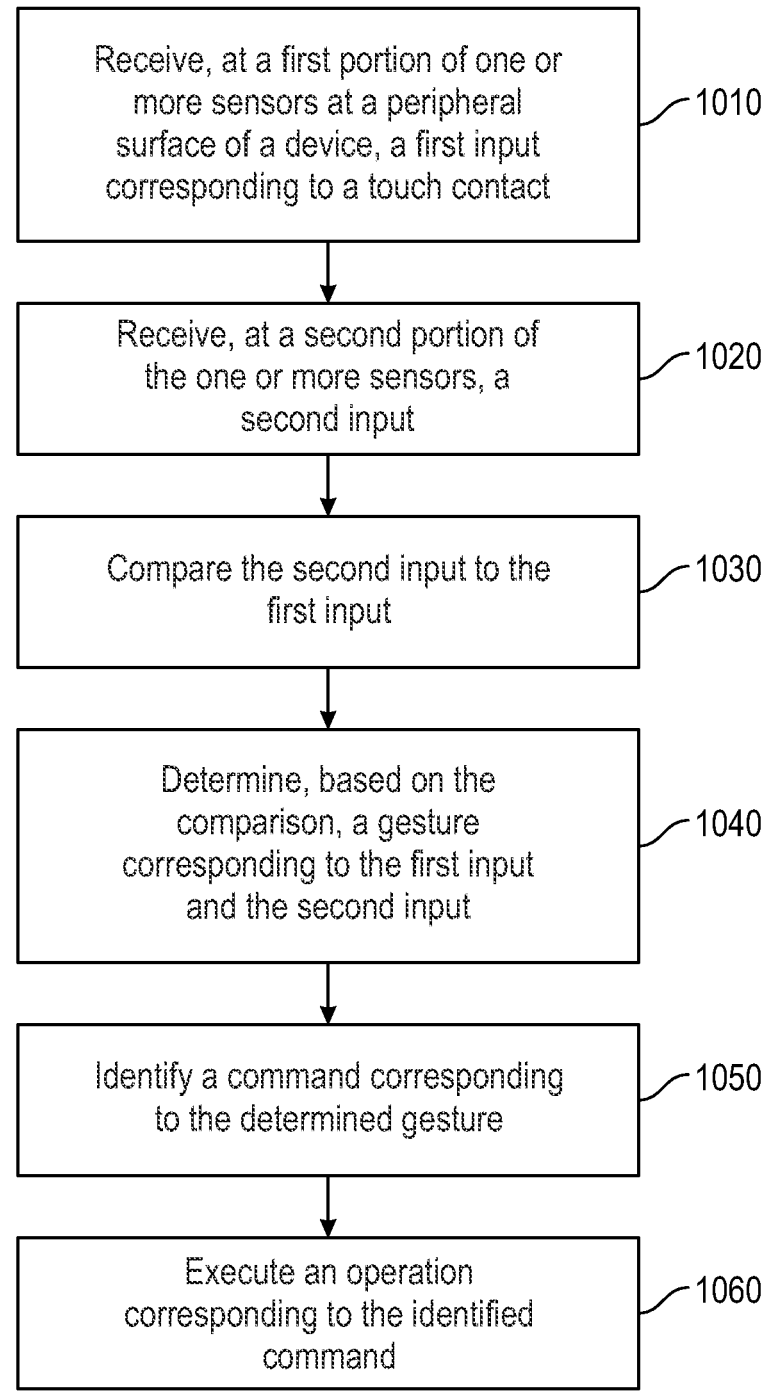
FIG. 10 is a flow diagram of a method of operation of the wireless accessory of FIG. 9B.

Referring to FIG. 10, a method 1000 of operation of the wireless earbud is described. While the operations are described in a particular order, it should be understood that the order may be modified, or operations may be performed simultaneously. Moreover, operations may be added or omitted.

In block 1010, a first input is received at a first portion of one or more sensors. The one or more sensors may be positioned at a peripheral surface of the wireless accessory, such as at a top and/or bottom portion of a peripheral circumference. The first input may be, for example, a touch contact from a user's finger.

In block 1020, a second input is received at a second portion of the one or more sensors. For example, the second input may be received as the user's finger slides to a different location along the one or more sensors, such as described above in connection with FIG. 4B. In another example, the second input may be received at a same location as the first input but covering a greater surface area of the one or more sensors, such as described above in connection with FIG. 4A.

In block 1030, the second input is compared to the first input. For example, as described above in connection with FIGS. 6-7, a position, location, coverage area, time, or other attributes of the first and second input may be compared.

In block 1040, a gesture is determined based on the comparison of the first and second inputs. For example, the gesture may be determined to be a squeeze, a clockwise rotation, a counterclockwise rotation, or the like.

In block 1050, a command corresponding to the determined gesture may be identified. For example, the command may be an instruction to adjust a volume of audio playback, adjust content, start/stop playback, or otherwise control playback through the accessory. In block 1060, an operation corresponding to the command may be executed. For example, a signal corresponding to the command may be transmitted from the wireless accessory to the host device, which performs an operation such as starting or ceasing relay of streamed packets to the accessory. As another example, the operation may be executed by a local processor within the accessory.

The knob-like input described above is advantageous in that it allows for multiple various input gestures on a small form factor device with minimal buttons or other movable parts that can break or interfere with other components. Moreover, the input can be received without unseating the accessory from the position in which it is worn by the user.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

The invention claimed is:

1. A wireless accessory, comprising:
a housing having a peripheral surface;
one or more sensors disposed at the peripheral surface, the one or more sensors adapted to receive contact input, the one or more sensors comprising first and second pairs of complementary-shaped electrodes; and
one or more processors in communication with the one or more sensors, the one or more processors configured to:

receive a first input, the first input represented by a first detected change in a first combined capacitance value of an electrode from the first pair of complementary-shaped electrodes and an electrode from the second pair of complementary-shaped electrodes;

receive a second input, the second input represented by a second detected change in a second combined capacitance value of an electrode from the first pair of complementary-shaped electrodes and an electrode from the second pair of complementary-shaped electrodes;

compare the first and second detected changes of the first and second combined capacitance values of the first input and the second input, respectively;

determine, based on the comparison of the first and second detected changes of the first and second combined capacitance values of the first input and the second input, a gesture; and identify a command corresponding to the gesture.

2. The wireless accessory of claim 1, wherein each of the electrodes has a major surface, such that when first and second fingertips are placed onto first and second sides of the peripheral surface, the first and second fingertips overlie both electrodes of the respective first and second pairs of the electrodes.

3. The wireless accessory of claim 1, wherein the first combined capacitance value is comprised of a capacitance value from an outer electrode of the first pair of complementary-shaped electrodes and an outer electrode of the second pair of complementary-shaped electrodes that are connected in parallel, with the second combined capacitance value comprised of the capacitance value from of an inner electrode of the first pair of complementary-shaped electrodes and an inner electrode of the second pair of complementary-shaped electrodes that are connected in parallel.

4. The wireless accessory of claim 1, wherein the combined capacitance value for the first input, the second input, or both the first and second inputs is a non-linear combination.

5. The wireless accessory of claim 1, wherein the accessory is an earbud.

6. A method of controlling a wireless accessory, the method comprising:

receiving, at a first portion of one or more sensors at a peripheral surface of the wireless accessory, a first input corresponding to a touch contact comprising a detected change in a first combined capacitance value of an electrode of each pair of first and second pairs of complementary-shaped electrodes;

receiving, at a second portion of the one or more sensors, a second input comprising a detected change in a second combined capacitance value of an electrode of each pair of first and second pairs of complementary-shaped electrodes;

comparing, with one or more processors, the first input and the second input;

determining, based on the comparing, a gesture corresponding to the first input and the second input; and identifying, with the one or more processors, a command corresponding to the determined gesture.

7. The method of claim 6, wherein the first input is the result of changing an amount of an area of a major surface of the first electrode pair that is contacted by a fingertip and the second input is the result of changing an amount of an area of a major surface of the second electrode pair that is contacted by the a fingertip.

8. The method of claim 6, wherein each of the electrodes has a major surface that extends generally parallel to an adjacent surface of an external portion of the wireless accessory, such that when first and second fingertips are detected at the electrodes, the first and second fingertips overlie both electrodes of the respective first and second pairs of the electrodes.

9. The method of claim 6, wherein the first combined capacitance value is comprised of the capacitance value from an outer electrode of the first pair of complementary-shaped electrodes and an outer electrode of the second pair of complementary-shaped electrodes that are connected in parallel, with the second combined capacitance value comprised of the capacitance value from an inner electrode of the first pair of complementary-shaped electrodes and an inner electrode of the second pair of complementary-shaped electrodes that are connected in parallel.

10. The method of claim 6, wherein the combined capacitance value for the first input, the second input, or both the first and second inputs is a non-linear combination.

11. A non-transitory computer-readable medium for controlling a wireless accessory, the non-transitory computer-readable medium having instructions stored thereon which, if executed by a computing device, cause the computing device to perform operations comprising:

receiving, at a first portion of one or more sensors at a peripheral surface of the wireless accessory, the one or more sensors comprising first and second pairs of complementary-shaped electrodes, a first input corresponding to a touch contact, the first input represented by a first detected change in a first combined capacitance value of an electrode from the first pair of complementary-shaped electrodes and an electrode from the second pair of complementary-shaped electrodes;

receiving, at a second portion of the one or more sensors, a second input, the second input represented by a second detected change in a second combined capacitance value of an electrode from the first pair of complementary-shaped electrodes and an electrode from the second pair of complementary-shaped electrodes;

comparing the first input and the second input;

determining, based on the comparing, a gesture corresponding to the first input and the second input; and identifying a command corresponding to the determined gesture.

12. The non-transitory computer-readable medium of claim 11, wherein each of the first pair and the second pair of complementary-shaped electrodes are triangle-shaped electrodes, each pair oriented such that a longest side of each of the electrodes of the pair confronts one another.

13. The wireless accessory of claim 1, wherein each of the first pair and the second pair of complementary-shaped electrodes are triangle-shaped electrodes, each pair oriented such that a longest side of each of the electrodes of the pair confronts one another.

14. The method of claim 6, wherein each of the first pair and the second pair of complementary-shaped electrodes are triangle-shaped electrodes, each pair oriented such that a longest side of each of the electrodes of the pair confronts one another.

* * * * *